United States Patent
Mao et al.

(10) Patent No.: US 10,871,258 B2
(45) Date of Patent: Dec. 22, 2020

(54) METHOD AND SYSTEM FOR CONTROLLING GIMBAL

(71) Applicant: SZ DJI OSMO TECHNOLOGY CO., LTD., Shenzhen (CN)

(72) Inventors: Chenglin Mao, Shenzhen (CN); Linchao Bao, Shenzhen (CN); Pan Hu, Shenzhen (CN); Zisheng Cao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/265,595

(22) Filed: Feb. 1, 2019

(65) Prior Publication Data

US 2019/0178436 A1    Jun. 13, 2019

Related U.S. Application Data

(63) Continuation of application No. PCT/CN2016/093062, filed on Aug. 3, 2016.

(51) Int. Cl.
| | |
|---|---|
| F16M 11/00 | (2006.01) |
| F16M 11/12 | (2006.01) |
| H04N 5/232 | (2006.01) |
| G05D 1/00 | (2006.01) |
| B64C 39/02 | (2006.01) |
| G06K 9/32 | (2006.01) |

(Continued)

(52) U.S. Cl.
CPC ......... *F16M 11/123* (2013.01); *B64C 39/024* (2013.01); *G05D 1/00* (2013.01); *G06K 9/3241* (2013.01); *G06T 5/002* (2013.01); *H04N 5/2253* (2013.01); *H04N 5/23219* (2013.01); *H04N 5/23229* (2013.01); *H04N 5/23248* (2013.01); *H04N 5/23299* (2018.08)

(58) Field of Classification Search
CPC ...... F16M 11/041; F16M 11/18; F16M 11/10; B64C 39/024; B64C 39/02; B64D 47/08
USPC .......................... 248/660, 661, 662; 396/421
See application file for complete search history.

(56) References Cited

U.S. PATENT DOCUMENTS

| | | | |
|---|---|---|---|
| 2004/0174453 A1* | 9/2004 | Okada | B64D 47/08 348/333.06 |
| 2005/0125142 A1* | 6/2005 | Yamane | G01C 11/00 701/510 |

(Continued)

FOREIGN PATENT DOCUMENTS

| | | |
|---|---|---|
| CN | 1670478 A | 9/2005 |
| CN | 101166239 A | 4/2008 |

(Continued)

OTHER PUBLICATIONS

The World Intellectual Property Organization (WIPO) the International Search Report for PCT/CN2016/093062 dated May 3, 2017 8 pages.

*Primary Examiner* — Steven M Marsh
(74) *Attorney, Agent, or Firm* — Anova Law Group, PLLC

(57) ABSTRACT

A method for controlling a gimbal includes obtaining an image recorded by an image sensor that is carried by the gimbal, extracting a reference object from the image, determining an offset attitude angle of the image sensor according to position information of the reference object in a preset coordinate system, and adjusting the attitude of the image sensor by the gimbal according to the offset attitude angle.

15 Claims, 11 Drawing Sheets

(51) Int. Cl.
  *G06T 5/00* (2006.01)
  *H04N 5/225* (2006.01)

(56) References Cited

U.S. PATENT DOCUMENTS

| | | | | |
|---|---|---|---|---|
| 2008/0035797 | A1* | 2/2008 | Defendini | B64G 1/244 |
| | | | | 244/165 |
| 2008/0094480 | A1 | 4/2008 | Swarr et al. | |
| 2009/0115850 | A1* | 5/2009 | Nakamura | G01S 3/7864 |
| | | | | 348/169 |
| 2009/0125223 | A1* | 5/2009 | Higgins | G06T 7/246 |
| | | | | 701/532 |
| 2009/0326816 | A1* | 12/2009 | Park | G01C 21/165 |
| | | | | 701/501 |
| 2010/0318336 | A1* | 12/2010 | Falangas | G06F 30/15 |
| | | | | 703/8 |
| 2013/0338859 | A1* | 12/2013 | Yamasaki | G05D 1/0055 |
| | | | | 701/3 |

FOREIGN PATENT DOCUMENTS

| | | | |
|---|---|---|---|
| CN | 103697883 | A | 4/2014 |
| CN | 103914065 | A | 7/2014 |
| CN | 104378622 | A | 2/2015 |
| CN | 105513072 | A | 4/2016 |
| CN | 105644785 | A | 6/2016 |
| JP | 2002188917 | A | 7/2002 |
| JP | 2007173966 | A | 7/2007 |
| JP | 2013062879 | A | 4/2013 |

\* cited by examiner

METHOD AND SYSTEM FOR CONTROLLING GIMBAL

CROSS-REFERENCE TO RELATED APPLICATION

This application is a continuation of International Application No. PCT/CN2016/093062, filed on Aug. 3, 2016, the entire contents of which are incorporated herein by reference.

TECHNICAL FIELD

The present disclosure generally relates to aerial photography technology and, more particularly, to a method and system for controlling a gimbal.

BACKGROUND

Unmanned aerial vehicles (UAVs) for aerial photography generally include a fuselage, a gimbal, and a camera. When the UAV is in flight, the flight attitude is generally required to be balanced, and the gimbal is generally required to adjust an attitude of the camera to be balanced during the process of aerial photography. A flight control of the UAV estimates the attitude by combining attitude data detected by various sensors, thereby controlling the balance of the attitude. Similarly, the gimbal also estimates its own attitude. The gimbal acquires the attitude data of the flight control at a certain frequency to correct the attitude estimated by itself. Therefore, if the estimated attitude data of the flight controller or the gimbal is incorrectly, the camera will be subject to a wrong attitude adjustment, resulting in a phenomenon that the camera tilts in a pitch angle direction and a roll angle direction. The phenomenon is also referred as "crooked neck" phenomenon. Due to the crooked neck of the camera, the aerial images/videos are distorted.

Under the premise that the safety factor of the flight of the UAV is not impaired, in order to improve the quality of aerial photography and increase the safety factor of the flight of the UAV, people proposed to detect a horizontal line on the aerial image from the UAV, and to adjust the attitude of the gimbal and the attitude of the fuselage by ensuring the level of the horizontal line.

SUMMARY

In accordance with the disclosure, there is provided a method for controlling a gimbal including obtaining an image recorded by an image sensor that is carried by the gimbal, extracting a reference object from the image, determining an offset attitude angle of the image sensor according to position information of the reference object in a preset coordinate system, and adjusting the attitude of the image sensor by the gimbal according to the offset attitude angle.

Also in accordance with the disclosure, there is provided a gimbal control system including an image sensor and at least one processor coupled to the image sensor. The at least one processor is configured to obtain an image recorded by the image sensor that is carried by a gimbal, extract a reference object from the image, determine an offset attitude angle of the image sensor, according to position information of the reference object in a preset coordinate system, and adjust the attitude of the image sensor by the gimbal, according to the offset attitude angle.

Also in accordance with the disclosure, there is provided a method for controlling an electronic image stabilization system including obtaining an image in a capture area on an image sensor, extracting a reference object from the image, determining an offset attitude angle of a view angle corresponding to the capture area, according to position information of the reference object in a preset coordinate system, and adjusting a position of the capture area, according to the offset attitude angle.

DETAILED DESCRIPTION OF EMBODIMENTS

Figure 1:
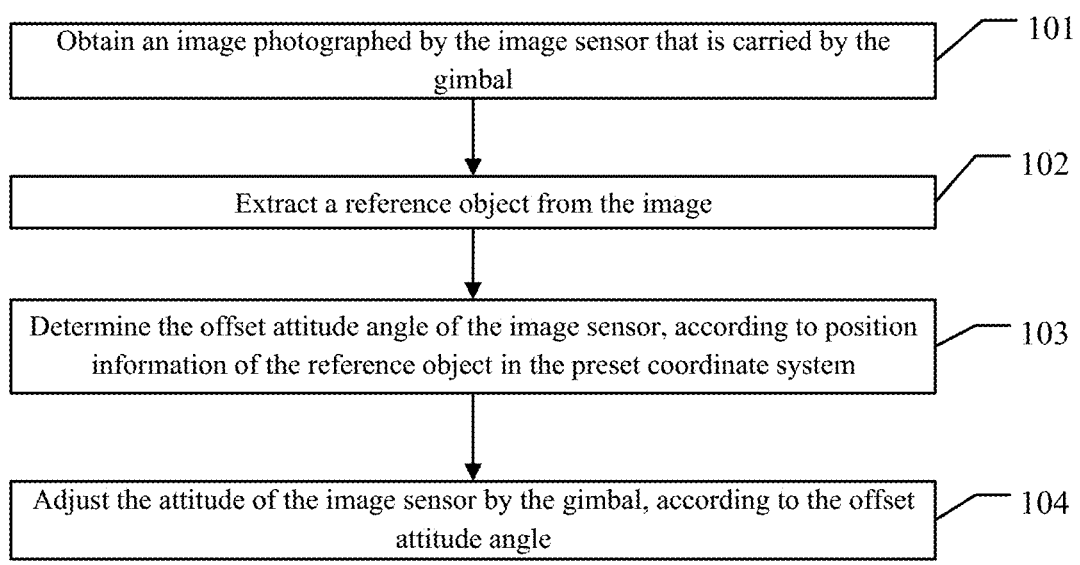
FIG. 1 is a schematic flowchart of a method for controlling a gimbal according to an embodiment of the present disclosure.

Technical schemes of the disclosed embodiments will be described below with reference to the drawings. It will be appreciated that the described embodiments are some rather than all of the embodiments of the present disclosure. Other embodiments conceived by those having ordinary skills in the art on the basis of the disclosed embodiments without inventive efforts should fall within the scope of the present disclosure.

The terms "first," "second," or the like in the specification, claims, and the drawings of the disclosure are used to distinguish similar elements, and are not intended to illustrate a particular sequence or order. It will be appreciated that the data used this way can be interchanged when appropriate, such that the embodiments described herein can be implemented in a sequence other than what is illustrated or described herein. Furthermore, the term "including," "comprising," or any other variation thereof are intended to cover a non-exclusive inclusion, such that a process, a method, an article, or an apparatus that comprises a plurality of steps or modules includes not only those steps or modules but also other steps or modules that are not explicitly listed, or also includes steps or modules that are inherent to the process, the method, the article, or the apparatus. The division of modules herein is merely a logical division, and there may be other divisions when implemented in practical applications. For example, multiple modules may be combined or integrated into another system, or some features may be omitted or not implemented. Moreover, the coupling or direct coupling or communication connection between the modules shown or discussed may be the indirect coupling between the modules via some interfaces or the communication connection can be in electrical or other similar form, which is not limited herein. In addition, the modules or sub-modules described as separate components may or may not be physically separated, may or may not be physical modules, or may be distributed to multiple circuit modules, and some or all of the modules may be selected, according to the actual requirements, to accomplish the purpose of the schemes of the embodiments of the disclosure.

A method and system for controlling a gimbal, and a method for controlling an electronic image stabilization system consistent with the disclosure, which can be used in the field of aerial photography technology and can solve the problem of the crooked neck of the camera in the existing mechanisms of the existing technologies, will be described in detail with reference to the drawings.

To solve the above-described technical problems, the following technical schemes consistent with the disclosure is provided. An image recorded by an image sensor is obtained and a reference straight line is extracted in the image. Coordinates of the reference straight line in a preset coordinate system are calculated. An offset attitude angle of the image sensor with respect to a horizontal plane is calculated according to the calculated coordinates. The attitude of the gimbal is corrected based on the calculated offset attitude angle to correct an attitude of the image sensor carried by the gimbal.

FIG. 1 is a schematic flowchart of a method for controlling a gimbal consistent with the disclosure. Herein, a mechanical gimbal is taken as an example for illustration.

As shown in FIG. 1, at 101, an image recorded by the image sensor that is carried by the gimbal is obtained.

At 102, a reference object is extracted from the image.

The reference object can be extracted from the image through the following processes a to c.

At a, features in the image can be extracted.

The features can include at least one of a straight line, a regular curve, a regular graphic, or a point. When the feature is the straight line, a set of straight lines on the image that satisfies a preset condition can be extracted. When the set of straight lines satisfying the preset condition is extracted, edge information of the reference object can be extracted, and the set of straight lines in a horizontal direction or the set of straight lines in a vertical direction can be extracted from the edge information by using a straight-line detection algorithm. The specific extraction method is not limited herein.

At b, characteristic values of the features can be determined.

When the feature is the straight line, the characteristic value of each straight line in the set of straight lines can be determined. When the feature is the straight line, the characteristic value can include, but is not limited to, a grayscale of regions on two sides of the straight line, a color of the regions on two sides of the straight line, a uniformity of the straight line, and/or an angle of the straight line.

At c, the feature whose characteristic value satisfies a preset selection rule can be determined from the features as the reference object, according to the characteristic values of the features.

Figure 2:
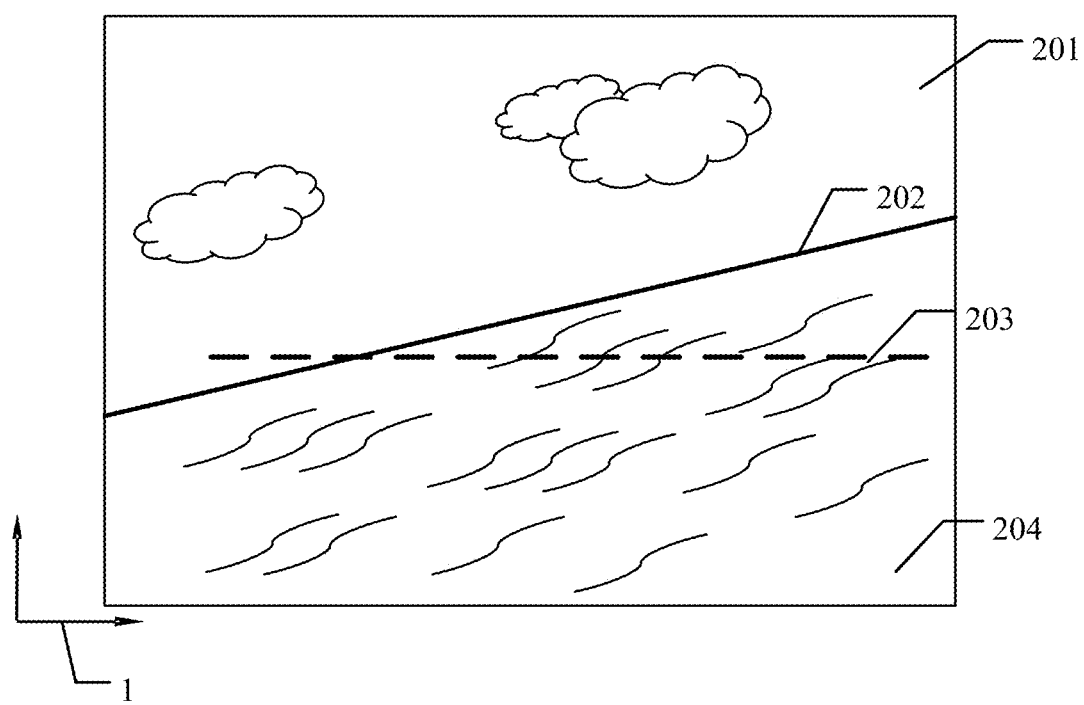
FIG. 2 is a schematic diagram of an image of a sea level recorded by an image sensor according to an embodiment of the present disclosure.

FIG. 2 is a schematic diagram of an image of a sea level recorded by the image sensor consistent with the disclosure. A region indicated by a reference numeral 201 in FIG. 2 represents the sky. The solid line indicated by the reference numeral 202 in FIG. 2 indicates the recorded sea level (corresponding to the detected horizontal line). The dotted line indicated by the reference numeral 203 in FIG. 2 is the straight line in a preset specific direction, for example, the horizontal line. The detected horizontal line refers to a true horizontal line of the scene recorded by the image sensor. The horizontal line refers to the horizontal line from a view of the image sensor, such as a straight line parallel to a width direction of the image sensor. For example, the attitude of the image sensor can be corrected by adjusting the detected horizontal line to be coincident with the horizontal line. The region indicated by the reference numeral 204 in FIG. 2 represents the sea. Thus, according to the characteristic values of the straight lines, the straight line whose characteristic value satisfies the preset selection rule can be selected from the set of straight lines and determined as the reference object. For example, a target straight line in the specific direction, such as the recorded sea level, can be determined as the reference object, according to the characteristic values of the straight lines.

The specific direction can include at least one of the horizontal direction detected by an attitude sensor, the vertical direction detected by the attitude sensor, or a preset direction detected by the attitude sensor. The preset direction can be selected according to an actual shooting scene, the reference object of the image, or the like. For example, when the shooting scene is a natural scene and the reference object is the sea level, the preset direction can be the horizontal direction. As another example, there can be a plurality of reference objects in the shooting scene, for example, including the sea level, a close-up ship, a close-up building, or a building from a distant view, as long as the object can be used as the reference object. In this scenario, there are multiple preset directions for the plurality of reference objects in the recorded image, for example, including both the horizontal direction and vertical direction at the same time. After the characteristic values of the straight lines in the set of straight lines are determined, the straight lines in the horizontal direction and the straight lines in the vertical direction can be separately selected. Combining the straight lines obtained in the two directions, a target horizontal line close to a true horizontal line can be calculated.

At 103, the offset attitude angle of the image sensor is determined, according to position information of the reference object in the preset coordinate system.

Figure 3:
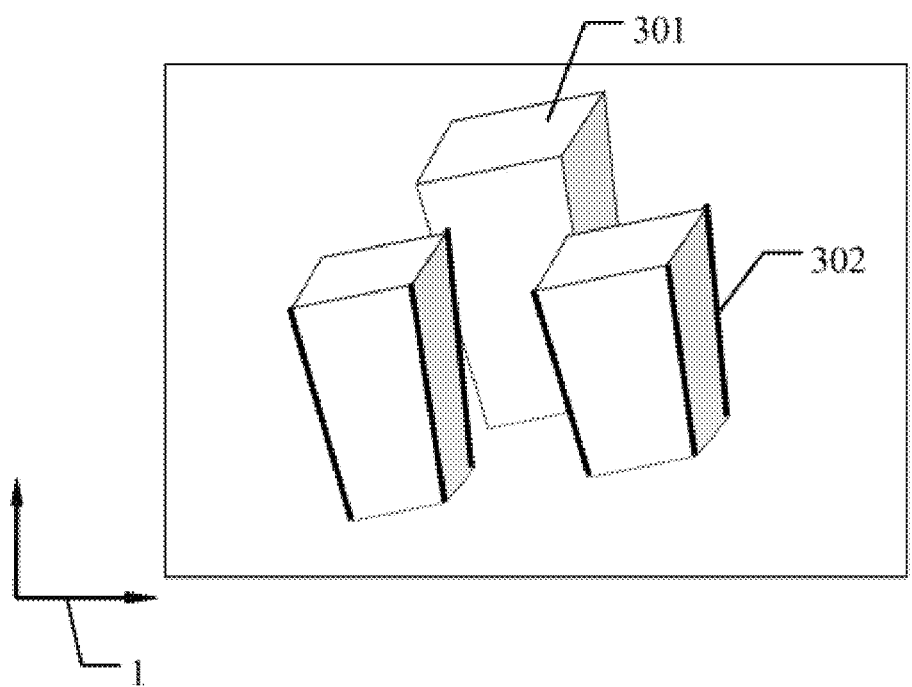
FIG. 3 is a schematic diagram of extracting a reference object from a recorded building according to an embodiment of the present disclosure.
Figure 4:
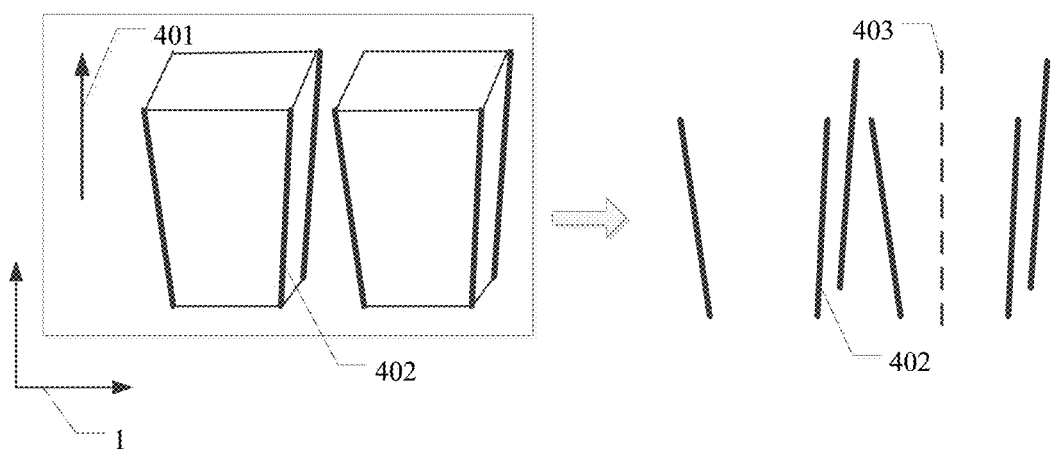
FIG. 4 is a schematic diagram of fitting a set of straight lines into a straight line according to an embodiment of the present disclosure.
Figure 5:
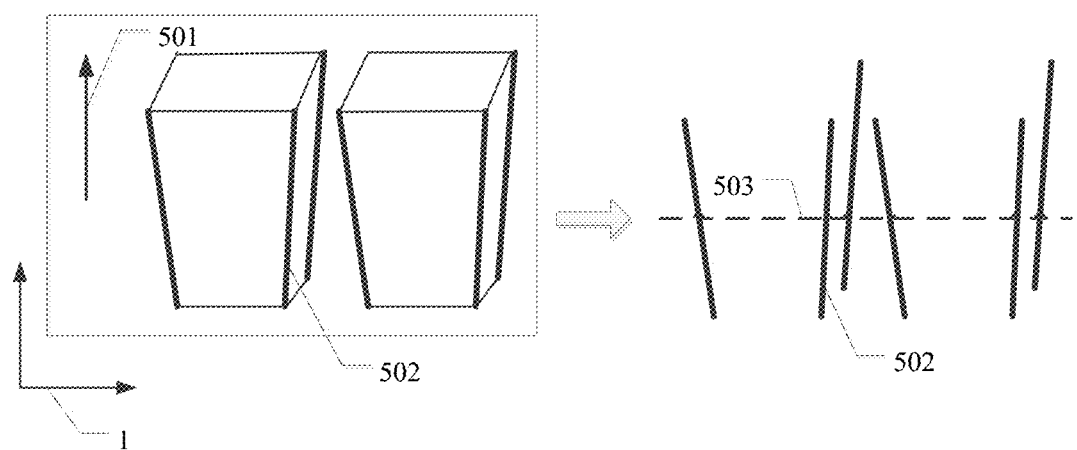
FIG. 5 is a schematic diagram of obtaining a horizontal line according to extracted edge lines according to an embodiment of the present disclosure.

FIG. 3 is a schematic diagram of extracting the reference object from a recorded building consistent with the disclosure. FIG. 4 is a schematic diagram of fitting the set of straight lines into the straight line consistent with the disclosure. FIG. 5 is a schematic diagram of obtaining the horizontal line according to extracted edge lines consistent with the disclosure.

The preset coordinate system refers to a predetermined coordinate system on an interactive interface, which can be any coordinate system such as two-dimensional (2D) coordinate system, three-dimensional (3D) coordinate system, or the like. In order to save computation resources, a length direction and the width direction of the image can be used as two mutually perpendicular axes of the 2D coordinate system (e.g., the 2D coordinate system as indicated by the reference numeral 1 in FIG. 3), or a direction perpendicular to the image can be used as a third axis to form the 3D coordinate system (e.g., the 3D coordinate system as indicated by the reference numeral 2 in FIG. 5).

Furthermore, the offset attitude angle of the image sensor can be obtained by calculating a rotation matrix of the reference object in the preset coordinate system with respect to the specific direction and then the rotation matrix can be decomposed. The offset attitude angle can include a pitch angle and a roll angle.

At 104, the attitude of the image sensor is adjusted by the gimbal, according to the offset attitude angle.

In some embodiments, the attitude of the image sensor can be adjusted by controlling a power apparatus of the gimbal, such that a direction of the reference object in the image recorded by the adjusted image sensor can coincide with the specific direction.

In some embodiments, when the gimbal is carried by a flight device, the offset attitude angle can also be feedback to the flight device and the gimbal. The offset attitude angle can be used by the flight device to correct its own attitude and the gimbal to correct its attitude.

In some embodiments, if a movable object carrying the gimbal is the flight device, when the offset attitude angle is determined to be greater than a preset angle threshold, a warning signal can also be sent, so as to timely adjust the flight device to the attitude suitable for flying. The movable object can include a filming device moving on the ground and having the image sensor, the gimbal carrying the image sensor, the flight device carrying the image sensor, or the like.

In some embodiments, the position information of the reference object in the preset coordinate system can be determined from the image recorded by the image sensor. The offset attitude angle of the image sensor can be determined according to the position information. According to the offset attitude angle, the attitude of the image sensor can be adjusted by the gimbal, such that the crooked neck phenomenon of the image sensor can be avoided.

In some embodiments, at least two images can be used. Extracting the reference object from the image and determining the offset attitude angle of the image sensor, according to the position information of the reference object in the preset coordinate system, can include the followings. The reference objects can be extracted in the at least two images. A fitted reference object can be obtained by fitting the reference objects in the at least two images. The offset attitude angle of the image sensor can be determined, according to the position information of the fitting reference object in the preset coordinate system. In some embodiments, the two images can be two adjacent image frames recorded by the image sensor. In some other embodiments, the two images can be two image frames recorded by the image sensor over a certain time interval.

In some embodiments, when the feature is the straight line, determining the characteristic values of the straight lines in the set of straight lines can include the following. At least one of the grayscale of regions on two sides of each straight line in the set of straight lines, the color of the regions on two sides of each straight line in the set of straight lines, the uniformity of each straight line, or the angle of each straight line in the set of straight lines, can be calculated.

One of the grayscale, the color, the uniformity, or the angle, or two or more of them can be calculated, which can be determined according to a processing capability of the device or a required accuracy, and is not limited herein. For example, the solid line indicated by the reference numeral 202 in the image shown in FIG. 2 is the straight line for which the characteristic value is to be calculated. When the characteristic values are calculated, the grayscale and color of the regions on two sides of the straight line 202 (including the region indicated by the reference numeral 201 and the region indicated by the reference numeral 204), and the uniformity and the angle of the straight line 202 (e.g., the pitch angle, the roll angle, and a yaw angle) can be calculated and the characteristic value of the straight line 202 can be finally obtained. The characteristic values of other straight lines in FIG. 2 can also be calculated, and the methods are similar as above and detailed description will be omitted here.

The grayscale can be obtained according to mean values of the grayscales of the regions on two sides of the straight line that satisfies the preset condition, for example, by the following formula:

$$G=(E_1-E_2)^2$$

where G represents the grayscale, E1 represents the mean value of the grayscale of the region above the horizontal line, and E2 represents the mean value of the grayscale of the region below the horizontal line.

The color can be obtained according to the mean values of blue components of the two sides of the straight line that satisfies the preset condition, for example, by the following formula:

$$B=(F_1-F_2)^2$$

where B represents the blue component, F1 represents the mean value of the blue component of the region above the horizontal line, and F2 represents the mean value of the blue component of the region below the horizontal line.

The uniformity can be obtained, according to the mean value of the grayscales of pixels on the straight line that satisfies the preset condition, the mean value of gradients of the pixels on the straight line that satisfies the preset condition, a variance of the grayscales of the pixels on the straight line that satisfies the preset condition, and the variance of the gradients of the pixels on the straight line that satisfies the preset condition, for example, by the following formula:

$$H=(E_3+E_4)/(COV1_{variance\ of\ grayscales\ of\ pixels\ on\ horizontal\ line}+COV2_{variance\ of\ gradients\ of\ pixels\ on\ horizontal\ line})$$

where H represents the uniformity, E3 represents the mean value of the grayscales of the pixels on the horizontal line, E4 represents the mean value of the grayscales of the pixels on the vertical line, COV1 represents variance of the grayscales of the pixels on the horizontal line, and COV2 represents variance of the gradients of the pixels on the horizontal line.

In some embodiments, in order to further reduce the calculation of the characteristic values for unnecessary straight lines and improve the computational efficiency, a range of straight lines for which the characteristic value needs to be calculated can be reduced. For example, some unqualified straight lines can be removed, or some straight lines that satisfy the preset condition can be first selected from the set of straight lines and then the characteristic values of the straight lines that satisfy the preset condition can be calculated. As such, the unnecessary calculations can be further reduced, the accuracy of the detection of the target horizontal line can be improved, and the crooked neck phenomenon of the photographing apparatus can be reduced. For example, parameters of the straight line, according to which if the straight line satisfies the preset condition can be determined, can include a length of the straight line, the pitch angle of the straight line, and the roll angle of the straight line. When the set of straight lines of the image in the horizontal direction is extracted, an angle threshold can be set, e.g., only the straight lines having the angles between the straight lines and the horizontal plane are within the angle threshold can be selected for calculating the horizontal line.

The preset condition includes at least one of the followings: the length of the straight line being greater than a first threshold, the pitch angle of the straight line being greater than a second threshold, and the roll angle of the straight line being greater than a third threshold.

Correspondingly, after the set of straight lines that satisfies the preset condition is extracted, determining the target straight line (e.g., the solid line indicated by the reference numeral 202 in FIG. 2) in the specific direction (e.g., the dotted line indicated by the reference numeral 203 in FIG. 2) from the set of straight lines, according to the characteristic values and the preset selection rule, can include the following. The straight lines whose characteristic values are greater than the preset threshold can be extracted as the target straight line from the straight lines that satisfy the preset condition, according to the preset selection rule and at least one of the grayscale, the color, and the gradient.

The preset selection rule can include a selecting formula. The selecting formula can include at least one of the grayscale, the color, and the gradient, and characteristic value coefficients corresponding to the characteristic values (i.e., the characteristic value coefficients corresponding to the at least one of the grayscale, the color, and the gradient). The characteristic value coefficients can be constant. The selection configuration of the characteristic value coefficients of the characteristic values can be based on an image feature of the image and/or a preset selection of the photograph apparatus. For example, the selection formula can be $F=p1\times G+p2\times B+p3\times H$, where p1, p2, p3 are the characteristic value coefficients of G, B, and H, respectively. The selection formula can also be variants based on the formula given herein, which is not limited by the present disclosure.

In some embodiments, because a plurality of straight lines whose characteristic values are larger than the preset threshold value can be selected, each straight line whose characteristic value is larger than the preset threshold value can be used as the target straight line, but the precision can be different. Therefore, in order to further improve the accuracy of the target straight line, curve fitting can be performed on each straight line in the straight lines whose characteristic values are greater than the preset threshold (e.g., the bold line indicated by the reference numeral 402 in FIG. 4) to obtain a theoretical straight line (e.g., the dashed line indicated by the reference numeral 403 in FIG. 4). The theoretical straight line can be used as the target straight line.

In some embodiments, the manner of curve fitting can include, such as the least squares algorithm, the norm constraint algorithm, or the like. Calculating the target straight line in the preset direction can include, but is not limited to, two application scenarios, i.e., calculating the horizontal line and calculating the vertical line.

Scenario 1: The Target Straight Line is the Target Horizontal Line.

A plurality of straight lines in the vertical direction (e.g., the bold edge line shown by the reference numeral 502 in FIG. 5) can be obtained. The vertical direction is indicated by the reference numeral 501 shown in FIG. 5. A plurality of straight lines in the horizontal direction can be obtained by calculating the straight lines being orthogonal with each straight line in the vertical region. The straight line in the horizontal direction that satisfies the difference in the color between the sky and the earth can be determined by calculating the color on two sides of each straight line in the horizontal direction, and can be used as the target horizontal line.

When there are a plurality of straight lines satisfying the difference in the color between the sky and the earth, the curve fitting can be performed on each straight line in the straight lines satisfying the difference in the color between the sky and the earth to obtain the theoretical horizontal line (e.g., the straight line indicated by the reference numeral 503 in FIG. 5). The theoretical horizontal line can be used as the target horizontal line. When the curve fitting adopts the least squares method, the straight line with a smallest error when orthogonal with each straight line in the straight lines whose characteristic values are greater than the preset threshold can be obtained using the least squares method. That is, the straight line has the smallest error when being orthogonal with each straight line in the straight lines that satisfy the difference in the color between the sky and the earth. The straight line having the smallest error when being orthogonal with each straight line can be used as the target horizontal line.

Scenario 2, the Target Straight Line is the Target Vertical Line.

The curve fitting can be performed on each straight line in the straight lines whose characteristic values are greater than the preset threshold (e.g., the bold lines indicated by the reference numeral 402 in FIG. 4) to obtain the theoretical vertical line (e.g., the dotted line indicated by the reference numeral 403 in FIG. 4). The theoretical vertical line can be used as the target vertical line. When the curve fitting adopts the least squares method, the straight line with the smallest error when paralleling each straight line in the straight lines whose characteristic values are greater than the preset threshold can be obtained using the least squares method. The straight line has the smallest error when paralleling with each straight line in the straight lines that satisfy the difference in the color between the sky and the earth. The straight line having the smallest error when parallel with each straight line can be used as the target vertical line.

In some embodiments, the image captured by the image sensor may have some deformation due to the change of the attitude, and a shape of a real object may not be completely presented in the image. If the offset attitude angle is calculated directly from the deformed image, some errors may be caused. Therefore, before the offset attitude angle is calculated, the image captured by the image sensor can be transformed, such that the transformed image can be similar to the real object, thereby reducing the error of calculating the offset attitude angle. The exemplary process can be as follows.

The attitude angle of the image sensor detected by the attitude sensor can be obtained, before the position information of the reference object in the image in the preset coordinate system is determined. According to the attitude angle of the image sensor when the image sensor is recording the image, a projection transformation can be performed on the image. The pitch angle, the roll angle, and/or the yaw angle of the gimbal can be approached to zero through the projection transformation, thereby eliminating a perspective effect of the image.

In some embodiments, before the rotation matrix of the reference object in the preset coordinate system with respect to the specific direction is determined, the method further includes according to the attitude angle of the image sensor when the image sensor is recording the image, performing inverse projection transformation on the reference object, and restoring the reference object to the real shape after the inverse projection transformation. Furthermore, if the inverse projection is performed on the target horizontal line, the calculated theoretical target horizontal line can be restored to the true horizontal line.

For example, when the specific direction is the horizontal direction, the target straight line is the target vertical line. When the offset attitude angle is calculated using the positional information of the reference object after the projection transformation, the inverse projection transformation can be performed on the target straight line obtained after the projection transformation to obtain the true target straight line corresponding to the initial image. The exemplary process can be as follows.

According to the position information of the target straight line in the preset coordinate system, the inverse projection transformation can be performed on the target straight line. The rotation matrix of the target straight line after the inverse projection transformation with respect to the horizontal direction can be calculated. The rotation matrix can be decomposed into the offset attitude angle, and the offset attitude angle can include the pitch angle and/or the roll angle.

Hereinafter, take performing the projection transformation on the straight line in the vertical direction as an example, because the offset angle in the pitch angle and the offset angle in the roll angle when the camera lens is recording and a distortion of the camera, when a building is being recorded, the straight edge lines in the vertical direction of the building in the recorded image may not be completely vertical, but have certain angular deviations with respect to the vertical direction, as shown in FIG. 3. If the calculation of the offset attitude angle is directly performed on the straight edge line of the building (the bold line shown by the reference numeral 302 in FIG. 3) that is used as the target straight line, a certain error can be caused. Therefore, before the offset attitude angle is calculated, the projection transformation needs to be performed on the vertical edge line of the building, such that the projection transformed edge line can be approximately parallel to the vertical plane. The ideal situation is that the pitch angle θ and the roll angle Φ of the vertical straight edge line after the projection transformation are both zero. In this scenario, the vertical straight edge line can be approximately perpendicular to the horizontal line.

In some embodiments, since the image captured by the image sensor may be distorted, if a distortion correction is not performed on the image, the calculated offset attitude angle may have a large error or even an inaccuracy. Therefore, the distortion correction may need to be performed on the distorted image, before the offset attitude angle is calculated. The distortion correction can be performed on the distorted object, before the set of the straight lines of the reference object in the preset direction is extracted, or after the projection transformation is performed on the reference object, or before the projection transformation is performed on the reference object, to obtain the distorted image. The object requiring the distortion correction can include the image, or the image after the projection transformation, the reference object, or the reference object after the projection transformation.

In some embodiments, the distortion correction process of the image can be realized by the following processes A to D.

At A, the pitch angle and the roll angle of the gimbal detected by the attitude sensor can be obtained. The attitude sensor can be a high-performance 3D motion attitude measurement system based on the micro-electro-mechanical system technology, including three-axis gyroscope, three-axis accelerometer (i.e., inertial measurement unit), and auxiliary motion sensor, such as three-axis electronic compass.

At B, a first rotation matrix can be calculated according to the pitch angle and a second rotation matrix can be calculated according to the roll angle.

The first rotation matrix R1 can be $$R1 = \begin{bmatrix} 1 & 0 & 0 \\ 0 & \cos\theta & \sin\theta \\ 0 & -\sin\theta & \cos\theta \end{bmatrix},$$

where θ is the pitch angle.

The second rotation matrix R2 can be $$R2 = \begin{bmatrix} \cos\Phi & \sin\Phi & 0 \\ -\sin\Phi & \cos\Phi & 0 \\ 0 & 0 & 1 \end{bmatrix},$$

where Φ is the roll angle.

It will be appreciated that the first rotation matrix and the second rotation matrix may be other formulas, and may be variants based on the formula given above, which are not limited by the present disclosure.

At C, the first rotation matrix and the second rotation matrix can be multiplied to obtain an overall rotation matrix.

The overall rotation matrix can be R=R2×R1, or R=R1×R2. An order of multiplication can be determined by the order in which the mechanical joint angles of the gimbal rotate. If the mechanical joint angle first rotates the pitch angle and then rotates the roll angle, then R=R2×R1, and if the mechanical joint angle first rotates the roll angle and then rotates the pitch angle, then R=R1×R2.

At D, according to an inverse matrix of the overall rotation matrix and an internal reference matrix of the photographing apparatus, the coordinate transformation can be performed on the first coordinate of the pixels on the reference object or the distorted image to obtain a second coordinate of the coordinate transformed pixels.

In some embodiments, the second coordinate may be distorted to obtain the distorted image, according to a distortion function, and the distorted image can include the pixels corresponding to a third coordinate obtained after the distortion.

In some embodiments, the projection transformation and the distortion correction can be performed on the image at the same time, and the coordinates of the pixels of the reference object after the projection transformation may be distorted to obtain the distorted reference object, according to the distortion function.

For example, assume the coordinates of the pixel on the reference object are (u, v), the internal parameter matrix of the camera is K, and the distortion parameters are (k1, k2, p1, p2, k3). The coordinates of the pixel of the reference object after the projection transformation are (u', v'). Thus, the relationship between the coordinates (u, v), the internal parameter matrix of the camera K, the distortion parameters (k1, k2, p1, p2, k3), and the coordinates (u', v') can be as follows:

$$\begin{bmatrix} x \\ y \\ z \end{bmatrix} = KR^{-1}F^{-1}\left\{ K^{-1}\begin{bmatrix} u \\ v \\ 1 \end{bmatrix}\right\}$$

$$u' = x/z$$

$$v' = y/z$$

Where F is the distortion function.

Assume that the undistorted coordinates are (x1, y1) and the post-distortion coordinates are (x2, y2), thus x2 and y2 can be obtained by the calculation:

$$r^2 = x1^2 + y1^2$$

$$x2 = x1*(1+k1*r^2+k2*r^4+k3*r^6)+2*p1*x1*y1+p2*(r^2+2*x1^2)$$

$$y2 = y1*(1+k1*r^2+k2*r^4+k3*r^6)+2*p2*x1*y1+p1*(r^2+2*y1^2)$$

In some embodiments, the captured image may be a plurality of images. The plurality of images can be a plurality of recorded single images, or can be multiple images acquired from a video captured by the image sensor. The reference object in each image can be separately extracted, and then the reference objects in the multiple images can be fitted to obtain a fitting reference object. The position information of the fitted reference object relative to the preset direction can be determined ultimately. For determining the position information of the fitted reference object, reference can be made to the method for obtaining the position information of the single image, and the detailed description is omitted here.

In some embodiments, before the set of straight lines in the specific direction on the image are extracted, the current shooting scene can be determined first, and then directly switched to the attitude-angle calculation mode in the shooting scene. The shooting scene can include, but is not limited to, a natural scene or an architectural scene.

In some embodiments, the shooting scene can be determined according to content of the image. For example, when the content in the image exceeding a first ratio is the natural scene, the shooting scene can be determined as the natural scene. When the content in the image exceeding a second ratio is a building, the shooting scene can be determined as the architectural scene.

In some embodiments, the shooting scene can be determined according to the current position information of the movable object. For example, when a physical region of the ground corresponding to the position information is determined to include a landmark building, the shooting scene can be determined as the architectural scene and can be presented to the photographing apparatus.

In some embodiments, the movable object can include the flight device. When the shooting scene is the natural scene, determining the shooting scene according to the current position information of the movable object can include the following. If a current flight height of the flight device is higher than a fourth threshold, the current natural scene can be determined as a preset natural scene of the flight device, and the current natural scene can be determined as a valid scene. If the current flight height of the flight device is lower than a fifth threshold, the current natural scene can be determined to be outside the preset natural scene of the flight device, and the current natural scene can be determined as a non-valid scene.

In some embodiments, the movable object can include the flight device, and the flight device can include a navigation interaction interface. Determining the shooting scene according to the current position information of the movable object can include the following. Whether a specific building exists within a preset range of the position information can be determined, according to the position information of the flight device currently in the navigation interaction interface. The specific building can be the building higher than a six threshold or the landmark building.

If there is the specific building, the shooting scene can be determined as the preset architectural scene of the photographing apparatus. The preset architectural scene can be a low-altitude urban scene with the flight height below a seventh threshold.

If there is no specific building and the physical region corresponding to the position information is a city region, the shooting scene can be determined as an aerial scene with the flight height higher than an eighth threshold.

If there is no specific building and the physical region corresponding to the position information is not the city region, the shooting scene can be determined as the preset natural scene of the photographing apparatus.

In some embodiments, the movable object can also update the built-in preset architectural scene through a learning mode to adapt to the varied and diversified architectural scene. For example, when a first specific building is determined to be in the image and the first specific building is outside the preset architectural scene, the architectural scene of the first specific building can be recorded in the preset architectural scene. After a new image is captured, automatically switch to a calculation mode corresponding to the architectural scene of the first specific building and calculate the target horizontal line according to the calculation mode.

Figure 7:
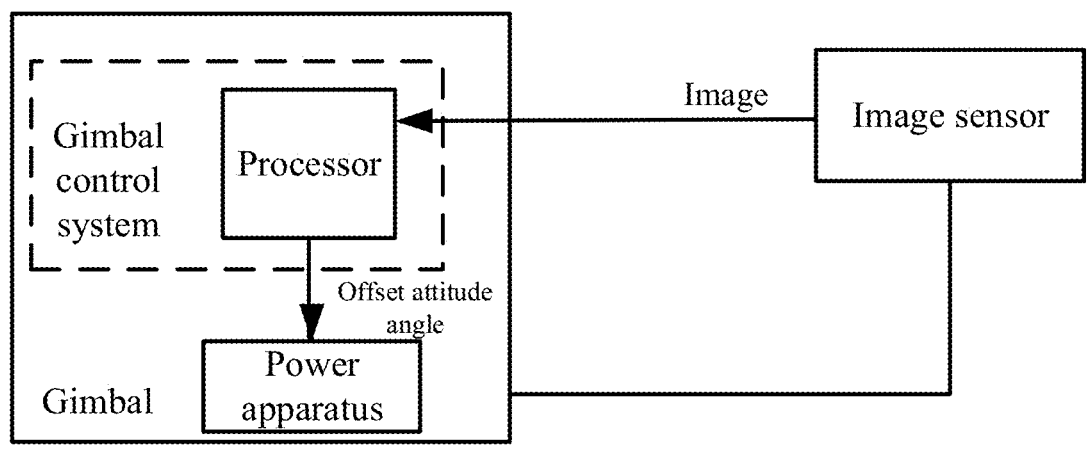
FIG. 7 is a schematic structural diagram of a gimbal control system according to an embodiment of the present disclosure.

FIG. 7 is a schematic structural diagram of a gimbal control system consistent with the disclosure. The gimbal control system can implement the method for controlling the gimbal shown in FIG. 1. As shown in FIG. 7, the gimbal control system includes at least one processor. The at least one process is configured to obtain the image recorded by the image sensor that is carried by the gimbal, extract the reference object from the image, determine the offset attitude angle of the image sensor, according to the position information of the reference object in the preset coordinate system, and adjust the attitude of the image sensor by the gimbal, according to the offset attitude angle.

In some embodiments, the processor can be configured to extract the features in the image, determine the characteristic values of the features, and determine the feature whose characteristic value satisfies a preset selection rule among the features and use as the reference object, according to the characteristic values of the features.

The features can include at least one of a straight line, a regular curve, a regular graphic, or a point.

In some embodiments, when the feature is the straight line, the processor can be configured to calculate at least one of the grayscale of regions on two sides of the straight line, the color of the regions on two sides of the straight line, the uniformity of the straight line, or the angle of the straight line.

In some embodiments, the process can be configured to select the straight line whose characteristic value is greater than the preset threshold as the reference object from the features characterized by the straight lines.

In some embodiments, the process can be configured to identify the straight line having the smallest error when being simultaneously parallel or perpendicular to each of the straight lines having the feature values greater than the preset threshold by the least square method, and used the straight line having the smallest error as the reference object.

In some embodiments, the gimbal control system can further include the attitude sensor. The attitude sensor is communicatively coupled to the processor, and the attitude sensor is configured to detect the attitude angle of the image sensor when the image sensor is recording the image.

The processor can be further configured to perform the projection transformation on the image according to the attitude angle detected by the attitude sensor.

In some embodiments, the attitude angle can include the pitch angle and the roll angle. The processor can be configured to calculate the first rotation matrix according to the pitch angle of the image sensor when the image sensor is recording the image and the second rotation matrix according to the roll angle of the image sensor when the image sensor is recording the image, multiple the first rotation matrix and the second rotation matrix to obtain the overall rotation matrix, and perform the coordinate transformation on the coordinates of pixels on the image according to the overall rotation matrix.

In some embodiments, before the reference object is extracted from the image, or before the projection transformation is performed on the image, the processor can be further configured to perform the distortion correction on the object that needs the distortion correction. The object requiring the distortion correction the can include the image, or the image after the projection transformation, or the reference object, or the reference object after the projection transformation.

In some embodiments, the processor can be configured to calculate the rotation matrix of the reference object in the preset coordinate system with respect to the specific direction, and decompose the rotation matrix to obtain the offset attitude angle of the image sensor.

The specific direction can include at least one of the horizontal direction, the vertical direction, or the preset direction detected by the attitude sensor.

In some embodiments, before the rotation matrix of the reference object in the preset coordinate system with respect to the specific direction is determined, the processor can be further configured to perform the inverse projection transformation on the reference object, according to the attitude angle of the image sensor when the image sensor is recording the image.

In some embodiments, the processor can be configured to control the power apparatus to adjust the attitude of the image sensor, such that the direction of the reference object in the image recorded by the adjusted image sensor can coincide with the specific direction.

In some embodiments, before the set of straight lines on the image in the preset direction is extracted, the processor can be further configured to determine the current shooting scene. The shooting scene can include the natural scene or the architectural scene.

In some embodiments, the gimbal can be mounted on the movable object, and the processor can be configured to perform one of the following: determining the shooting scene according to the content of the image, and determining the shooting scene according to the position information when the image is recorded.

In the embodiments, at least two images can be obtained, and the processor can be configured to extract the reference objects in the at least two images, obtain the fitted reference object by fitting the reference objects in the at least two images; and determine the offset attitude angle of the image sensor, according to the position information of the fitting reference object in the preset coordinate system.

The embodiment of the present disclosure further provides a gimbal. The gimbal includes the gimbal control system as shown in FIG. 7 and the power apparatus. The power apparatus is communicatively coupled to the gimbal control system.

The gimbal control system can be configured to adjust the attitude of the gimbal by controlling the power apparatus to adjust the attitude of the image sensor carried by the gimbal. The power apparatus can include at least one motor.

Figure 8:
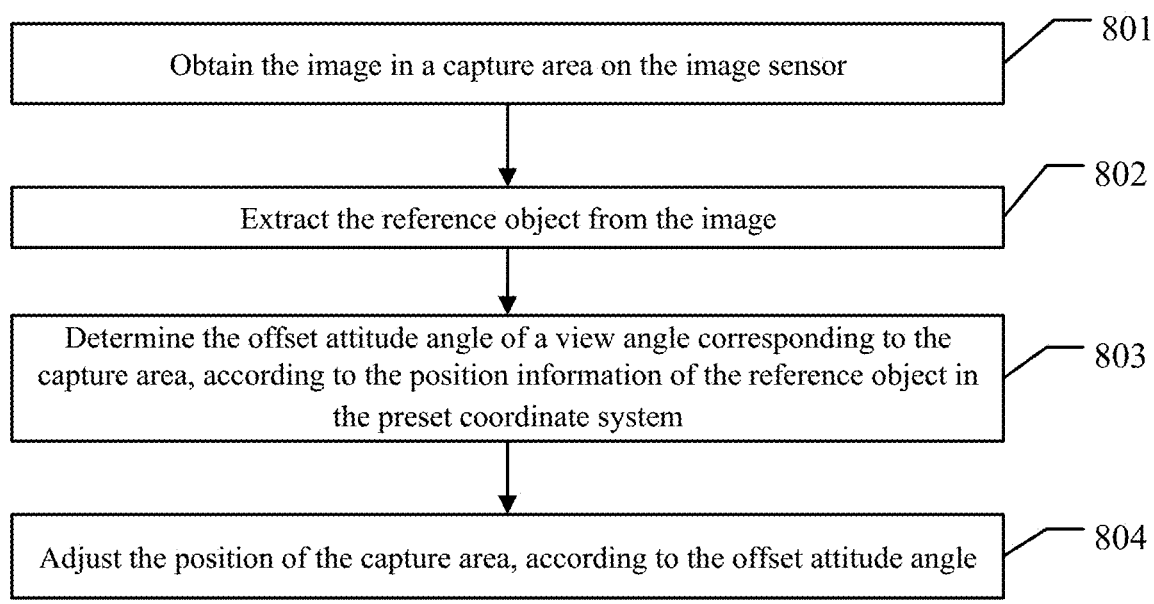
FIG. 8 is a schematic flowchart of a method for controlling an electronic image stabilization system according to an embodiment of the present disclosure.

Hereinafter, a method for controlling an electronic image stabilization system will be described from the perspective of the electronic gimbal. FIG. 8 is a schematic flowchart of a method for controlling an electronic image stabilization system consistent with the disclosure.

As shown in FIG. 8, at 801, the image in a capture area on the image sensor is obtained.

At 802, the reference object is extracted from the image.

At 803, the offset attitude angle of a view angle corresponding to the capture area is determined, according to the position information of the reference object in the preset coordinate system.

At 804, the position of the capture area is adjusted, according to the offset attitude angle.

In some embodiments, the adjustment of the position of the capture area can be controlled, according to the offset attitude angle, such that the direction of the reference object of the image in the adjusted capture area can coincide with the specific direction.

In some embodiments, the position information of the reference object in the preset coordinate system can be determined from the image in the capture area. The offset attitude angle of the capture area can be determined according to the position information. The position of the capturing area can be adjusted by the gimbal according to the offset attitude angle, thereby avoiding the crooked necking phenomenon of the image sensor.

In some embodiments, extracting the reference object from the image can include the following. The features in the image can be extracted. The characteristic values of the features can be determined. According to the characteristic values of the features, the feature having the characteristic value that satisfies the preset selection rule can be determined from the features as the reference object.

The features can include at least one of a straight line, a regular curve, a regular graphic, or a point.

In some embodiments, when the feature is the straight line, determining the characteristic values of the features can include calculating at least one of the grayscale of regions on two sides of the straight line, the color of the regions on two sides of the straight line, and the uniformity of the straight line.

In some embodiments, according to the characteristic values of the features, determining the feature having the characteristic value that satisfies the preset selection rule from the features as the reference object can include selecting the straight line whose characteristic value is greater than the preset threshold as the target straight line from the set of the straight lines.

In some embodiments, selecting the straight line whose characteristic value is greater than the preset threshold as the target straight line from the features characterized by the straight lines can include identifying the straight line having the smallest error when being simultaneously parallel or perpendicular to each of the straight lines having the feature value greater than the preset threshold by the least square method as the reference object, In some embodiments, before the reference object is extracted from the image, the method can further include obtaining the attitude angle of the view angle corresponding to the capture area when the image is captured and performing the projection transformation on the image according to the attitude angle of the view angle. The transform parameters of the projection transformation are not limited herein.

In some embodiments, the attitude angle can include the pitch angle and the roll angle. Performing the projection transformation on the image, according to the attitude angle of the view angle corresponding to the capture area when the image is captured, can include the following. The first rotation matrix can be calculated according to the pitch angle, when the capture area is capturing the image. The second rotation matrix can be calculated according to the roll angle, when the capture area is capturing the image. The first rotation matrix and the second rotation matrix can be multiplied to obtain the overall rotation matrix. The coordinate transformation can be performed on the coordinates of pixels on the image according to the overall rotation matrix.

In some embodiments, before the reference object is extracted from the image, or before the projection transformation is performed on the image, the method can further include performing the distortion correction on the object that needs the distortion correction to obtain the distorted image. The object requiring the distortion correction the can include the image, or the image after the projection transformation, or the reference object, or the reference object after the projection transformation.

In some embodiments, before determining the rotation matrix of the reference object in the preset coordinate system with respect to the specific direction, the method can further include the following. The inverse projection transformation can be performed on the reference object, according to the attitude angle of the view angle corresponding to the capture area, when the image is captured. The rotation matrix of the reference object can be calculated, after the inverse projection transformation with respect to the specific direction. The rotation matrix can be decomposed to obtain the offset attitude angle of the view angle corresponding to the capture area.

In some embodiments, the method can further include before the set of the straight lines in the preset direction is extracted from the image, determining the current shooting scene. The shooting scene can include the natural scene or the architectural scene.

In some embodiments, at least two images can be obtained. Determining the position information of the reference object in the preset coordinate system in the image can include the following. The reference objects can be extracted in the at least two images. The fitted reference object can be obtained by fitting the reference objects in the at least two images. The offset attitude angle of the image sensor can be determined, according to the position information of the fitting reference object in the preset coordinate system.

Figure 9:
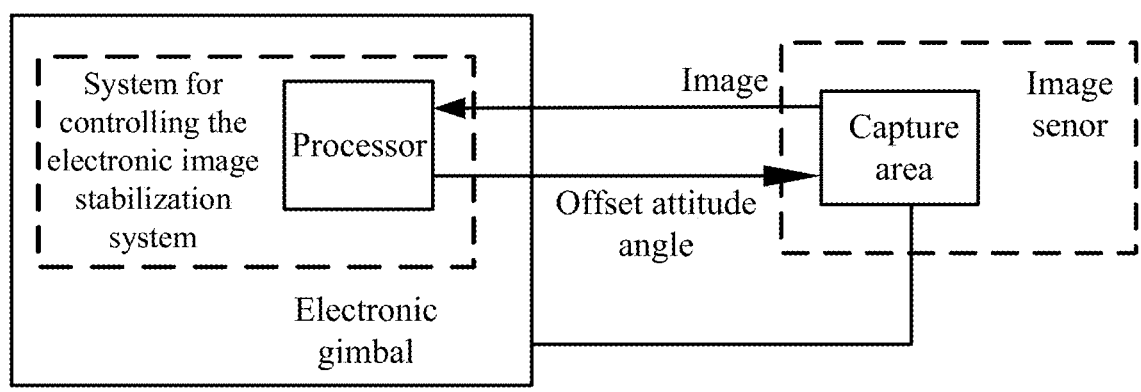
FIG. 9 is a schematic structural diagram of an electronic image stabilization system according to an embodiment of the present disclosure.

FIG. 9 is a schematic structural diagram of an electronic image stabilization system consistent with the disclosure. The system for controlling the electronic image stabilization system can implement the method for controlling the electronic image stabilization system shown in FIG. 8. The system for controlling the electronic image stabilization system is an electronic gimbal control system. The electronic gimbal is a new type of integrated gimbal compared to the conventional gimbal. An angle of view and zoom of the lens can be controlled inside the camera through the program settings. As shown in FIG. 9, the control system includes at least one processor. The at least one process is configured to obtain the image in the capture area on the image sensor, extract the reference object from the image, determine the offset attitude angle of a view angle corresponding to the capture area, according to the position information of the reference object in the preset coordinate system, and adjust the position of the capture area, according to the offset attitude angle.

For example, the adjustment of the position of the capture area can be controlled, according to the offset attitude angle, such that the direction of the reference object of the image in the adjusted capture area can coincide with the specific direction. In some embodiments, the specific direction can include at least one of the horizontal direction, the vertical direction, or the preset direction detected.

In some embodiments, the processor can be configured to extract the features in the image, determine the characteristic values of the features, and according to the characteristic values of the features, determine the feature having the characteristic value that satisfies the preset selection rule from the features as the reference object.

The features can include at least one of a straight line, a regular curve, a regular graphic, or a point.

In some embodiments, when the feature is the straight line, the processor can be configured to calculate at least one of the grayscale of regions on two sides of the straight line, the color of the regions on two sides of the straight line, or the uniformity of the straight line.

In some embodiments, the processor can be configured to select the straight line whose characteristic value is greater than the preset threshold as the reference object from the features characterized by the straight lines.

In some embodiments, the processor can be configured to identify the straight line having the smallest error when being simultaneously parallel or perpendicular to each of the straight lines having the feature value greater than the preset threshold by the least square method, and used the straight line having the smallest error as the reference object.

In some embodiments, the control system can further include the attitude sensor. The attitude sensor can be configured to detect the attitude angle of the view angle corresponding to the capturing area when the image is captured.

The processor can be further configured to perform the projection transformation on the image according to the attitude angle of the view angle corresponding to the capturing area, when the image is captured.

The attitude angle can include the pitch angle and the roll angle. The specific process of performing the projection transformation on the image is as follows. The first rotation matrix can be calculated according to the pitch angle, when the capture area is capturing the image. The second rotation matrix can be calculated according to the roll angle, when the capture area is capturing the image. The first rotation matrix and the second rotation matrix can be multiplied to obtain the overall rotation matrix. The coordinate transformation can be performed on the coordinates of pixels on the image according to the overall rotation matrix.

In some embodiments, before the position information of the reference object in the preset coordinate system is determined, the processor can be further configured to calculate the rotation matrix of the reference object relative to the specific direction in the preset coordinate system, and decompose the rotation matrix to obtain the offset attitude angle of the view angle corresponding to the capture area.

In some embodiments, before the set of the straight lines of the reference object in the preset direction is extracted, or after the projection transformation is performed on the reference object, the processor can be further configured to perform the distortion correction on the object that needs the distortion correction to obtain the distorted image. The image requiring the distortion correction the can include the image, or the image after the projection transformation, or the reference object, or the reference object after the projection transformation.

In some embodiments, before the rotation matrix of the reference object in the preset coordinate system with respect to the specific direction is determined, the processor can be further configured to perform the inverse projection transformation on the reference object, according to the attitude angle of the view angle corresponding to the capture area when the image is captured.

In some embodiments, the processor can be further configured to determine the current shooting scene, before the set of the straight lines in the preset direction on the image is extracted. The shooting scene can include the natural scene or the architectural scene.

In some embodiments, at least two images can be obtained. The processor can be configured to extract the reference objects in the at least two images, obtain the fitted reference object by fitting the reference objects in the at least two images, and determine the offset attitude angle of the image sensor, according to the position information of the fitting reference object in the preset coordinate system.

Figure 10:
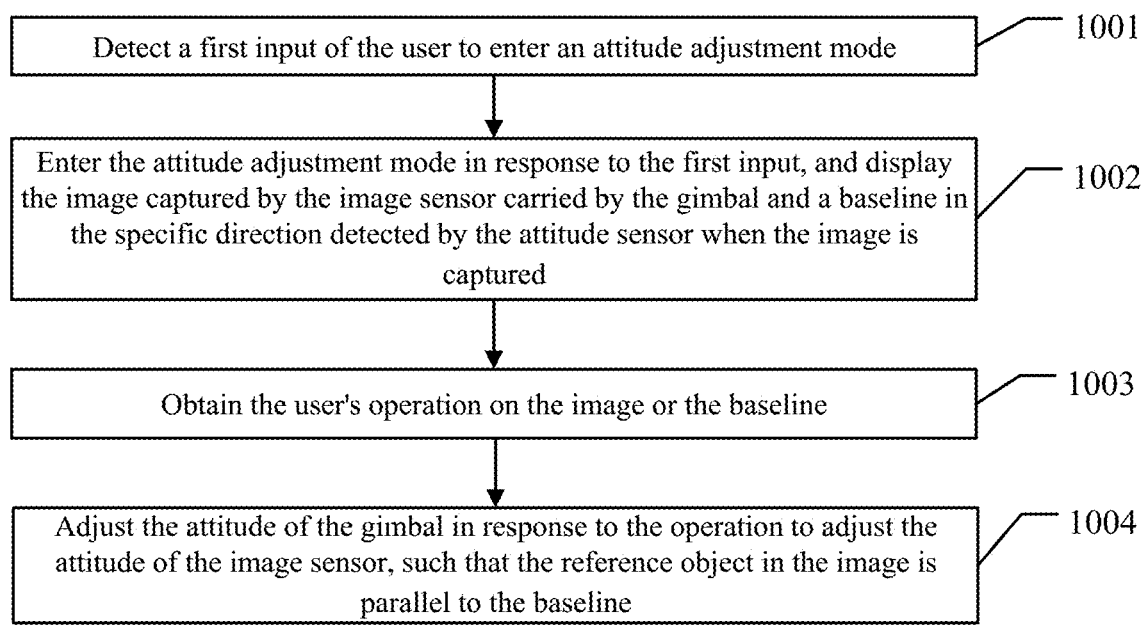
FIG. 10 is another flowchart of a method for controlling a gimbal according to an embodiment of the present disclosure.

Hereinafter, the method for controlling the gimbal will be described from the perspective of user interaction. FIG. 10 is a flowchart of the method for controlling the gimbal consistent with the disclosure.

As shown in FIG. 10, at 1001, a first input of the user to enter an attitude adjustment mode is detected.

The first input can be that a vibration amplitude of the gimbal is greater than a certain value, the number of rotations of the gimbal toward a certain direction is greater than a certain number of times, the user inputs via a physical button, the user clicks a virtual button on an interactive interface or clicks on an application on the interactive interface, or the like. The specific manner of entering the attitude adjustment mode is not limited herein.

At 1002, the attitude adjustment mode is entered in response to the first input, and the image captured by the image sensor carried by the gimbal and a reference line in the specific direction detected by the attitude sensor when the image is captured are displayed.

At 1003, the user's operation on the image or the reference line is obtained.

The operation can include, but is not limited to, rotation and/or tilt.

The operation may also include at least one of translation, zooming in, and zooming out.

At 1004, the attitude of the gimbal is adjusted in response to the operation to adjust the attitude of the image sensor, such that the reference object in the image is parallel to the reference line.

Figure 6:
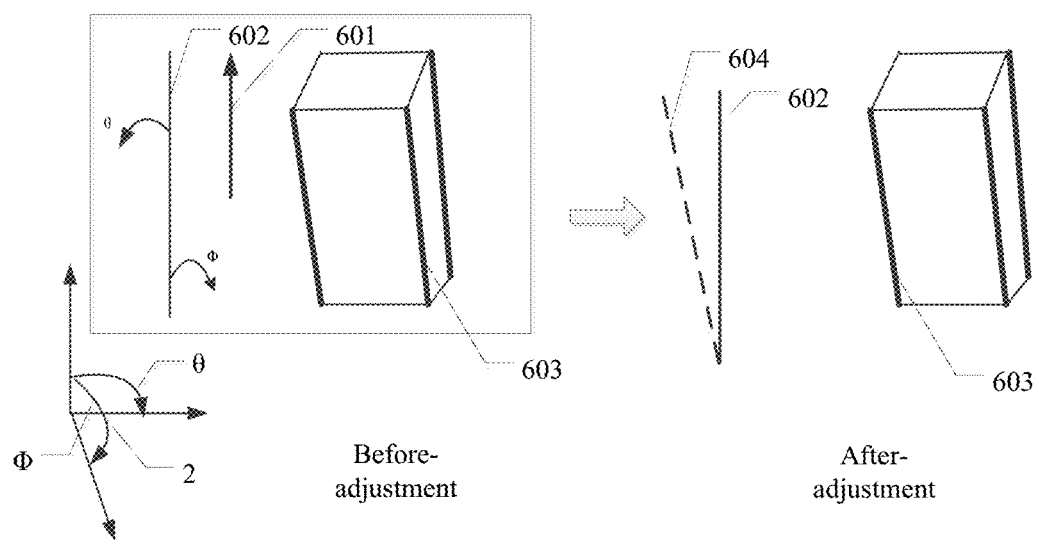
FIG. 6 is a schematic diagram of adjusting a reference line according to an embodiment of the present disclosure.

FIG. 6 is a schematic diagram of adjusting a reference line consistent with the disclosure. When the operation is rotation, as shown in FIG. 6, the roll angle of the image sensor can be adjusted by rotating the reference line (e.g., 602 shown in FIG. 6), so as to adjust the roll angle of the gimbal.

When the operation is tilt, as shown in FIG. 6, the pitch angle θ and/or the yaw angle Φ of the gimbal can be adjusted by tilting the reference line (e.g., 602 shown in FIG. 6), so as to adjust the pitch angle θ and/or the yaw angle Φ of the image sensor.

For example, as shown in FIG. 6, 601 shown in FIG. 6 indicates the specific direction, 602 shown in FIG. 6 indicates the reference line, 603 shown in FIG. 6 indicates the edge line on the building, and 604 shown in FIG. 6 indicated an adjusted reference line. When the operation includes rotation and tilt, the reference line 602 can be rotated and tilted at the same time, and the adjusted reference line is 604. As shown in FIG. 6, the adjusted reference line 604 is parallel to the edge line 603.

When a distance between the reference object and the reference line is greater than a preset distance, even though the attitude of the reference line or the attitude of the reference object is adjusted, the distance may be still too far or there are still many interfering pixels in the image, therefore, some interference may be caused when determining whether the reference line and the reference object are parallel, or the reference line and the reference object cannot even reach a completely parallel goal.

Therefore, the distance between the reference line and the reference object needs to be shorten, and the operation can be the translation. The distance between the reference line and the reference object can be within the preset distance through translating the reference line to facilitate a comparison between the reference line and the reference object, thereby more intuitively adjusting the reference line or the reference object. To a certain extent, the accuracy of the adjustment can be also increased, such that the angle between the reference object and the reference line in every direction can approach zero.

When the reference object or the reference line is not significant on the image, or if the reference object is relatively small or the edge is not clear enough, a large error may be caused when adjusting a relative parallel position of the reference object and the reference line. Therefore, the reference object or the reference line needs to become more conspicuous, for example, by brightening, thickening, or increasing the background color of the reference line or the reference object, or the like, to facilitate the comparison of the relative position. An exemplary method for the comparison is by zooming in. Correspondingly, when the operation is zooming in, the reference object can be enlarged to be intuitively compared with the reference line. If there are more media content that affects the comparison between the enlarged reference object and the reference line, or if the enlarged reference object is too far from the reference line to conveniently adjust the comparison, the distance between the reference line and the reference object can be within the preset distance by translating the reference line or translating the reference object, thereby performing a more efficient comparison.

In the embodiments of the present disclosure, the position information of the reference object in the preset coordinate system can be determined from the image recorded by the image sensor, and then the offset attitude angle of the image sensor can be determined according to the position information, and the attitude of the image sensor can be adjusted by the gimbal, according to the offset attitude angle, such that the crooked neck phenomenon of the image sensor can be avoided.

When it is determined that the offset attitude angle is greater than the preset angle threshold, the warning signal can also be sent.

In some embodiments, after responding to the first input and before obtaining the user's operation on the image, the method can further include: obtaining a second input of the user, extracting the reference object from the image in response to the second input, and highlighting the reference object on the image.

The second input may include that the user inputs via the physical button, the user clicks a virtual button on the interactive interface, or clicks on an application on the interactive interface, slides, a respond of the duration of the dwell on the interactive interface exceeds a certain time threshold, or the like. When the reference object is extracted in response to the second input, manual extraction may be used, for example, manually drawing an area from the picture to check and extract the reference object (e.g., leaving the screen after drawing the area, or performing a long press to display a drop-down menu and selecting "Extract" in the drop-down menu), or automatical extraction may be used, which is not limited herein.

In some embodiments, the method can further include the following. The rotation matrix of the reference object in the preset coordinate system with respect to the specific direction can be determined, according to the operation. The rotation matrix can be decomposed to obtain the offset attitude angle of the reference line to be adjusted with respect to the reference object. The attitude of the gimbal can be adjusted according to the offset attitude angle to adjust the attitude of the image sensor, such that the reference object in the image is parallel to the reference line.

In some embodiments, after responding to the first input and before obtaining the user's operation on the image or the reference line, the method can further include performing the projection transformation on the image, and correcting the deformed recorded image through the projection transformation to restore a real physical shape corresponding to the image. To a certain extent, by combining the reference line and the projected transformed image, the current attitude of the image sensor can be more accurately adjusted, such that the error of the attitude of the image sensor detected by the attitude sensor can be smaller, and accordingly, the quality of the new image that are subsequently recorded can be also improved.

In some embodiments, sometimes due to a long-term unadjusted attitude of the image sensor, or factors such as jitter when the photographer shoots the image, more serious distortion of the recorded image may be caused. If the image of the image sensor is directly adjusted using the distorted image, due to a large error in the image itself, the attitude of the image sensor may not be optimally adjusted, and it is more likely that an error adjustment may be made, such that the quality of the image recorded by the image sensor can be even lower. In order to solve the problem, the distortion correction can be performed on the recorded image before the projection transformation of the image, the exemplary process is as follows. The distortion correction can be performed on the image.

In some embodiments, when shooting a city at a low altitude, the recorded image may contain buildings of various heights and shapes. Thus, after the reference object (for example, the building having the highest and relatively regular shape) is selected, in order to facilitate the comparison with the reference line and adjust accordingly, the features of the reference object may also be extracted. The extracted features can be compared with the reference line, adjusted, or the like, and the exemplary implementation process can be as follows: obtaining the user's operation on the reference object, responding to the operation, and extracting features of the reference object. The features can include at least one of a regular curve, at least one point, a plane, or a straight line on the reference object.

For example, when the feature is the straight line on the reference object, the set of straight lines (e.g., six bold edge lines as indicated by the reference numeral 402 in FIG. 4) in the specific direction (e.g., the direction of the arrow indicated by the reference numeral 401 in FIG. 4) on the image may also be extracted. The six bold lines can be then fitted to the straight line (e.g., the dashed line indicated by the reference numeral 403 in FIG. 4). The characteristic values of the straight line in the set of straight lines can be determined, and the target straight line in the specific direction can be determined from the set of straight lines, according to the characteristic value of the straight line and the preset selection rule. In some embodiments, the straight line having the smallest error when being simultaneously parallel or perpendicular to each of the straight lines having the feature value greater than the preset threshold can be selected from the straight lines whose feature values are greater than the preset threshold as the feature of the reference object.

As another example, as shown in FIG. 6, the bold straight edge line (e.g., the bold straight line shown by the reference numeral 602 in FIG. 6) can be the target straight line in the specific direction. When the feature is the straight edge line of the reference object, then the response to the first operation can include at least one of the followings: rotating the reference line to adjust the roll angle of the reference line, according to the position information of the straight edge line in the preset coordinate system, such that the reference line can be parallel with the straight edge line to control the roll angle of the gimbal; tilting the reference line with respect to the straight edge line to adjust the pitch angle and/or the yaw angle of the reference line, such that the reference line can be parallel to the straight edge line to control the pitch angle or the yaw angle of the gimbal; or tilting the reference line with respect to the straight edge line, such that the reference line can be perpendicular to the edge to control the pitch or yaw angle of the gimbal.

As another example, when the feature is a certain plane on the reference object, the attitude of the plane or the reference line may be adjusted, such that the reference line can be parallel to the plane, thereby adjusting the attitude of the gimbal and the attitude of the image sensor.

Figure 11:
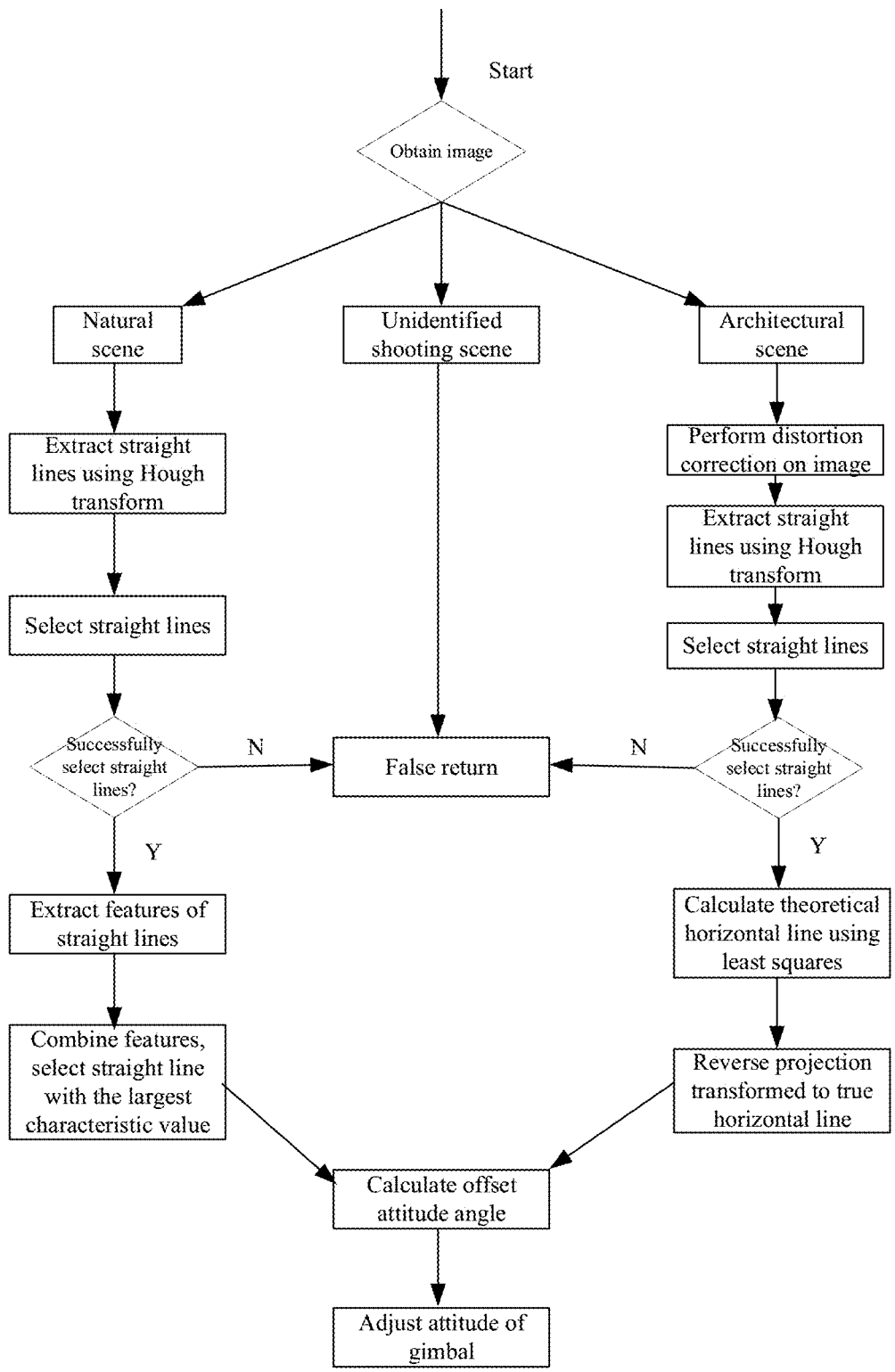
FIG. 11 is a schematic diagram of an application scenario of a method for controlling a gimbal according to an embodiment of the present disclosure.

For a better understanding, below is a specific application scenario used as an example to illustrate the method for controlling the gimbal consistent with the disclosure. FIG. 11 is a schematic diagram of the application scenario of the method for controlling the gimbal consistent with the disclosure. The mechanical gimbal can carry the camera, and the mechanical gimbal can include the gimbal control system. As shown in FIG. 11, after the camera records the image in the air, the gimbal control system obtains the image. The shooting scene is determined according to the content of the image or the current position of the UAV, and then the offset attitude angle calculation mode corresponding to the shooting scene will be entered. For example, when the shooting scene is the natural scene, first, the Hough transform is used to extract the appropriate straight lines from the image. The angles between the straight lines and the horizontal plane can be within the preset angle threshold. Then the characteristic values of the straight lines are extracted, and the characteristic values of each straight line can be combined to obtain a combined feature. Then, the straight line having the largest value of the combined feature is selected from the straight lines as the horizontal line. Then, the offset attitude angle is calculated according to the horizontal line, and the attitude of the gimbal is corrected according to the offset attitude angle to correct the attitude of the camera.

As another example, when the shooting scene is the architecture scene, the distortion correction is first performed on the recorded image, and then the Hough transform is used to extract the appropriate straight lines from the corrected image. The angles between the straight lines and the vertical plane can be within the preset angle threshold. Then, the characteristic values of the straight lines can be extracted, and the straight lines that satisfy the skyline based on the color of the sky and earth can be selected, according to the characteristic value and the preset selection rule. Then, the least squares method is used to calculate the straight line with the smallest error when being orthogonal to each straight line satisfying the color of the sky and earth, and the straight line with the smallest error is used as the theoretical horizontal line. Then the inverse projection transformation is performed on the theoretical horizontal line to obtain the true horizontal line. Then, the offset attitude angle is calculated according to the true horizontal line, and the attitude of the gimbal is corrected according to the offset attitude angle to correct the attitude of the camera.

A computer storage medium is also provided by the disclosure. The computer storage medium can store a program. When the program is implemented, the gimbal control system can implement the method for controlling the gimbal, or the system for controlling the electronic image stabilization system can implement some or all of the steps of the method for controlling the electronic image stabilization system described above.

In the above embodiments, the descriptions of the various embodiments focus on different aspects, and for the parts that are not detailed described in a certain embodiment, reference can be made to the related descriptions of other embodiments.

It can be appreciated by those skilled in the art that for the specific working process of the system, the apparatus, and the module described above, reference can be made to the corresponding process in the foregoing embodiments of the method, and the details description is omitted herein for the convenience and brevity of the description.

In the embodiments of the present disclosure, the disclosed system, apparatus, and method may be implemented in other manners. For example, the embodiments of the apparatus described above are merely illustrative. For example, the division of units/circuits may only be a logical function division, and there may be other ways of dividing the units/circuits. For example, multiple units or circuits may be combined or may be integrated into another system, or some feature may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The functional units may be implemented either in hardware or in the form of software functional units.

The functional units consistent with the disclosure can be implemented in the form of computer program stored in a non-transitory computer-readable storage medium, which can be sold or used as a standalone product. The computer program can include instructions that enable a computer device, such as a personal computer, a server, or a network device, or a processor, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

The technical solutions provided by the present disclosure are described in detail above. The principle and implementation of the present disclosure are described herein using specific examples. The above description of the embodiments is merely for helping in understanding the method and the core ideas of the present disclosure. At the same time, those skilled in the art can change the specific embodiments and application scopes of the disclosure, based on the idea of the present disclosure. Therefore, the contents of the specification are not intended to limit the scope of the disclosure.

What is claimed is:

1. A method for controlling a gimbal comprising:
   obtaining an image recorded by an image sensor that is carried by the gimbal;
   performing a distortion correction on the image to generate a corrected image;
   extracting a reference object from the corrected image;
   determining an offset attitude angle of the image sensor according to position information of the reference object in a preset coordinate system; and
   adjusting the attitude of the image sensor by the gimbal according to the offset attitude angle.

2. The method according to claim 1, wherein extracting the reference object from the corrected image comprises:
   extracting features in the corrected image;
   determining characteristic values of the features; and
   determining, according to the characteristic values of the features, a feature whose characteristic value satisfies a preset selection rule from the features as the reference object.

3. The method according to claim 2, wherein the features comprise at least one of a straight line, a regular curve, or a point.

4. The method according to claim 3, wherein when the features include straight lines, determining the characteristic values of the features comprises:
   determining at least one of a grayscale of regions on two sides of one of the straight lines, a color of the regions on two sides of the one of the straight lines, a uniformity of the one of the straight lines, or an angle of the one of the straight lines.

5. The method according to claim 4, wherein determining, according to the characteristic values of the features, the feature whose characteristic value satisfies the preset selection rule from the features as the reference object, comprises:
   selecting, from the straight lines, a straight line whose characteristic value is greater than a preset threshold as the reference object.

6. The method according to claim 5, wherein selecting the straight line whose characteristic value is greater than the preset threshold as the reference object, comprises:
identifying, using a least square method, a straight line having a smallest error when being simultaneously parallel or perpendicular to each of straight lines having characteristic values greater than the preset threshold as the reference object.

7. The method according to claim 1, wherein before extracting the reference object from the corrected image, the method further comprises:
performing a projection transformation on the corrected image according to an attitude angle of the image sensor when the image sensor is recording the image.

8. The method according to claim 7, wherein:
the attitude angle comprises a pitch angle and a roll angle; and
performing the projection transformation on the corrected image according to the attitude angle of the image sensor when the image sensor is recording the image, comprises:
calculating a first rotation matrix according to the pitch angle of the image sensor when the image sensor is recording the image and a second rotation matrix according to the roll angle of the image sensor when the image sensor is recording the image;
multiplying the first rotation matrix and the second rotation matrix to obtain an overall rotation matrix; and
performing a coordinate transformation on coordinates of pixels on the image, according to the overall rotation matrix.

9. The method according to claim 1, wherein determining the offset attitude angle of the image sensor, according to the position information of the reference object in the preset coordinate system, comprises:
calculating a rotation matrix of the reference object in the preset coordinate system with respect to a specific direction; and
decomposing the rotation matrix to obtain the offset attitude angle of the image sensor.

10. The method according to claim 9, wherein the specific direction comprises at least one of a horizontal direction, a vertical direction, or a preset direction detected by the attitude sensor.

11. The method according to claim 9, wherein before calculating the rotation matrix of the reference object in the preset coordinate system with respect to the specific direction, the method further comprises:
performing an inverse projection transformation on the reference object according to the attitude angle of the image sensor when the image sensor is recording the image.

12. The method according to claim 9, wherein adjusting the attitude of the image sensor by the gimbal, according to the offset attitude angle, comprises:
controlling a power apparatus of the gimbal to adjust the attitude of the image sensor, such that the reference object in the image recorded by the adjusted image sensor coincides with the specific direction.

13. A method for controlling an electronic image stabilization system comprising:
obtaining an image in a capture area on an image sensor;
performing a distortion correction on the image to generate a corrected image;
extracting a reference object from the corrected image;
determining an offset attitude angle of a view angle corresponding to the capture area, according to position information of the reference object in a preset coordinate system; and
adjusting a position of the capture area, according to the offset attitude angle.

14. The method according to claim 13, wherein extracting the reference object from the corrected image comprises:
extracting features in the corrected image;
determining characteristic values of the features; and
determining, according to the characteristic values of the features, the feature whose characteristic value satisfies a preset selection rule from the features as the reference object.

15. The method according to claim 13, wherein before extracting the reference object from the corrected image, the method further comprises:
performing a projection transformation on the corrected image, according to the attitude angle of the view angle corresponding to the capture area when the capture area is capturing the image.

* * * * *